No. 754,663. PATENTED MAR. 15, 1904.
W. W. MARTIN.
DIOPTRICAL CHART.
APPLICATION FILED MAY 4, 1903.
NO MODEL.

Witnesses. Inventor.
A. N. Bush, William Willard Martin,
A. A. Cunningham

No. 754,663. Patented March 15, 1904.

UNITED STATES PATENT OFFICE.

WILLIAM WILLARD MARTIN, OF SALEM, OREGON.

DIOPTRICAL CHART.

SPECIFICATION forming part of Letters Patent No. 754,663, dated March 15, 1904.

Application filed May 4, 1903. Serial No. 155,647. (No model.)

*To all whom it may concern:*

Be it known that I, WILLIAM WILLARD MARTIN, a citizen of the United States, residing at Salem, in the county of Marion and State of Oregon, have invented a new and useful Dioptrical Chart, of which the following is a specification.

The object of this chart is to give the accommodative power present in the eye at different ages. With advancing age the accommodation gradually diminishes. This failure of the accommodation begins as early as the tenth year and occurs in all eyes, whatever their refraction. Although all people do not have exactly the same amplitude of accommodation at any given age, still there is much less variation than one would naturally suppose, so little, in fact, that we may safely rely upon this chart in at least ninety per cent. of our cases.

The accompanying drawings are upon a scale of five years, because it would crowd it to give each year, and one set of lenses is sufficient for nearly all patients for a period of five years without changing.

The dioptrical chart when put up is neatly framed, like a picture, with a good heavy glass. A hole is drilled through the center of the glass. A bolt passes through the glass, fastening the indexes on the outside in front of the chart. The indexes are made of any suitable material that can be washed and kept clean.

The chart may be made any practical size. Abbreviations and signs: Cm., centimeter; D., diopters; My., myopia; Hm., hypermetropia; N., minus or negative; $\infty$, infinity; P. P., punctum proximum, (near point;) P. R., punctum remotum, (far point.)

The chart gives the punctum proximum in centimeters and the amplitude of accommodation in diopters possessed by the emmetrope or the ametrope at any given age. To attain this is the aim of this chart and will be more fully set forth in detail.

The dioptrical chart is not intended to write prescriptions from, although it would be correct in about ninety per cent. of our cases. It is intended as an assistant to the optician and will work in harmony with the retinoscope, the ophthalmoscope, or any other instrument used by the opticians to measure the refraction of the eye, and a great help in estimating his cases.

Figure 1:
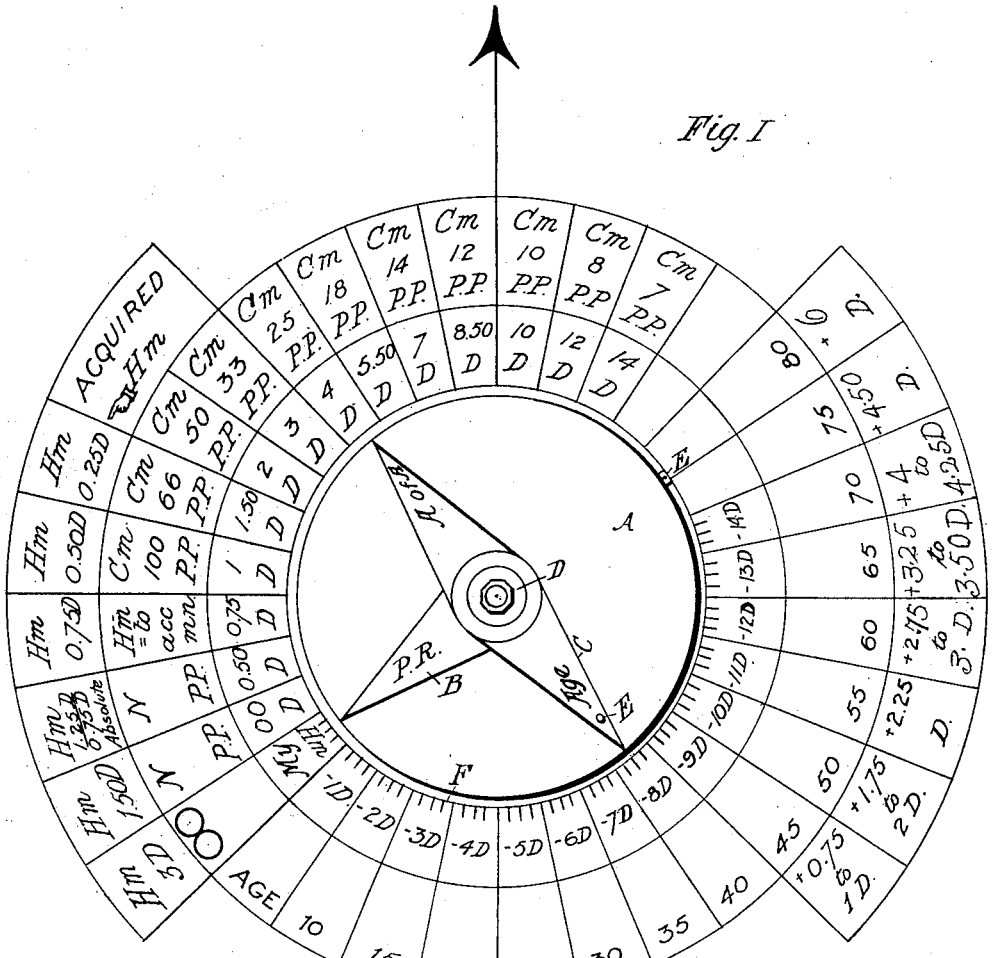
Figure 2:
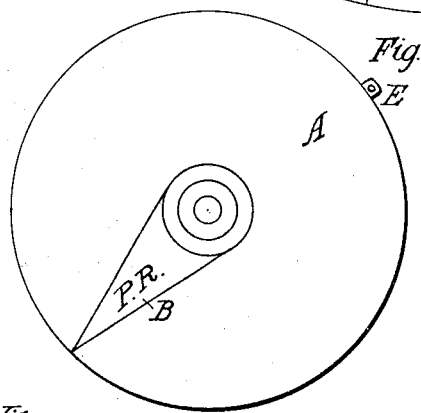
Figure 3:
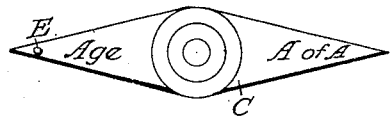

In the drawings, Figure 1 represents the plan of the dioptrical chart with the indexes as they are held in place by the bolt D. The indexes are allowed to be turned or moved to different positions on the chart. E represents a small handle to be used in moving the indexes. Fig. 2 represents the disk A with P. R. (punctum remotum) index B. This index is drawn upon or fastened onto the disk and moves with it. Fig. 3 represents the two-ended index C. One end is marked "age" and refers to the row of figures marked "Age" on the chart. The other end of the index C is marked "A. of A.," (amplitude of accommodation.) It also refers to all readings in the same radius. The graduated scale F refers to one-fourth diopters. The arrow merely shows the top of the chart.

When the retina is situated exactly at the principal focal distance of the refracting system of the eye, this condition is called "emmetropia" and is the unit of measure for the optician, as its refraction is the nearest to perfection. It is always the object of the optician to put his patient, no matter what his refraction, on a footing with the emmetrope. When he has attained this, it is all he can do.

It has been proven that the failure of the accommodation begins as early as the tenth year.

We will now consider a patient by the chart, knowing him to be an emmetrope ten years of age. The punctum remotum of an emmetrope is at infinity, which for all practical purposes may be considered as six meters, (or beyond,) so we will place "P. R." index upon the radius marked $\infty$ (infinity) and place index marked "age" upon the ten-year radius. The upper end of the index gives his punctum proximum seven centimeters and in the same radius, his amplitude of accommodation fourteen diopters. To make it clearer, the punctum remotum is the most distant point at which objects are seen distinctly. The publication, *Refraction of the Eye*, by Gustavus Hartridge, (tenth edition,) P. Blackiston's Sons & Co., 1012 Walnut street, Philadelphia, page 28, states: "Infinity is any distance beyond six meters, the rays coming from a point at or beyond that distance being parallel or almost so. The emmetropic eye, therefore, has its far point, or punctum remotum, situated at infinity. The hypermetropic eye has its punctum remotum beyond infinity, and the myopic eye has its punctum remotum at a finite distance." At fifteen years of age his punctum proximum is at eight centimeters and his amplitude of accommodation twelve diopters. At the age of twenty years his punctum proximum is at ten centimeters and his amplitude of accommodation ten diopters. At the age of twenty-five years his punctum proximum is at twelve centimeters, his amplitude of accommodation 8.50 diopters. At the age of thirty years his punctum proximum is at fourteen centimeters and his amplitude of accommodation seven diopters. At thirty-five years of age his punctum proximum is at eighteen centimeters, his amplitude of accommodation 5.50 diopters. At forty years of age his punctum proximum is at twenty-five centimeters, his amplitude of accommodation four diopters. At forty-five years of age his punctum proximum has receded to thirty-three centimeters. His amplitude of accommodation is only three diopters. Thirty-three centimeters equal three diopters, thus showing our emmetrope is becoming presbyopic. As he has to use all his accommodation to see distinctly at this point, he can do so for a short time only without fatigue. Therefore we will have to help him, and the only way is by giving the proper glasses.

It has been proven that an emmetrope can only use two-thirds to three-fourths of his amplitude of accommodation without fatigue. This being the case, our patient can only use continuously about two diopters of his accommodation or two-thirds of the whole accommodation, as he wishes to read at thirty-three centimeters, which requires three diopters of accommodation, and as he is only capable of using two diopters comfortably we must give him a pair of plus glasses of one diopter to make up the three diopters, thus leaving him a reserve of one-third of his amplitude of accommodation. So we look at the age end of index C in the outside row in the same radius and it says give him plus 0.75 to one diopter (sometimes a patient for their first glasses will not accept full correction is why the chart reads plus 0.75 to one diopter.) At fifty years of age his punctum proximum is at fifty centimeters. His amplitude of accommodation is two diopters, two-thirds of two diopters, 1.25 diopters; his reserve, 0.75 diopters. 1.25 diopters plus 1.75 diopters equals three diopters. Then his correcting-glasses would be 1.75 diopters to two diopters. Look in the same radius in the outside row to the right. At the age of fifty-five years his punctum proximum is at sixty-six and two-thirds centimeters and his amplitude of accommodation is 1.50 diopters. At this age we notice that the punctum remotum is also beginning to recede to the minus or negative side or beyond infinity, (here move the punctum-remotum index on to one point, 0.25 diopters on the scale F,) thus showing our emmetrope is becoming hypermetropic. This is not due to presbyopia or to the loss of accommodation, for the punctum remotum represents the "adjustment of the eye at rest" and is not influenced by the changes which are weakening its working power, but is caused by the crystalline lens becoming flattened by age, thereby losing a part of its positive refraction. So we see at this age our patient has taken on 0.25 diopters of hypermetropia. Look in the outside row to the left marked "Acquired hypermetropia" in the same radius. As his punctum remotum is still on the positive side of infinity, his amplitude of accommodation is 1.50 diopters. He can use two-thirds of his amplitude of accommodation, which is one diopter, to make up thirty-three centimeters, equals three diopters. We will have to give him a pair of lens plus two diopters and to correct his acquired hypermetropia add 0.25. Then we have two plus 0.25, 2.25 diopters. These are his correct glasses for reading. At the age of sixty years his punctum proximum has receded to one hundred centimeters, with only one diopter of accommodation, so he cannot use over 0.50 diopters of his accommodation. We will have to add 2.50 diopters to make up three diopters, and his acquired hypermetropia is 0.50 diopter—2.50 plus .50 equals three diopters—so we will give him 2.75 to three diopters for his correction. At the age of sixty-five his amplitude of accommodation is from 0.50 to 0.75 diopters, and he can use from 0.25 to 0.50 diopters. Then we must add 2.50 to 2.75 diopters, plus his acquired hypermetropia, which is 0.75 diopters. 2.50 plus 0.75, 3.25, to 2.75 plus 0.75 equals 3.50 diopters, his correcting-glasses. At seventy years of age his punctum proximum is at a negative point. He has 0.50 diopters of accommodation. He may be able to use 0.25 diopters continuously, or he may not, so we will have to add 2.75 to three diopters. His hypermetropia is now 1.25 diopters, so we have 2.75 plus 1.25 equals four diopters, to three plus 1.25 equals 4.25 diopters as his correcting-glasses. At the age of seventy-five and after he has no accommodation, so we will have to supply him with the full strength for reading. If he wishes to read at thirty-three centimeters, we will give him three diopters plus acquired hypermetropia. 1.50 plus three equals 4.50 diopters, his reading-glasses. At eighty years of age his acquired hypermetropia has reached three diopters, and we have to give him three diopters for his accommodation. Then we have three plus three diopters equals six diopters, his glasses for reading.

If we wish to consider an ametropic eye, we have only to place the P. R. index on the figures representing the punctum remotum of the patient. For instance, we are considering a myope of one diopter. We will place P. R. index on the figures "100" and "1 D." in the myopic row. His punctum remotum is then at one hundred centimeters or one meter. Place the age index at ten years. The "A. of A." end of the index shows him to have an amplitude of fourteen diopters, the same as the emmetrope; but by reason of his defect he has fourteen plus one diopter equals fifteen, then one hundred fifteenths six and two-thirds for his punctum proximum. At fifteen years of age his amplitude is thirteen diopters. At twenty years of age his amplitude is eleven diopters, and so on.

Example: Suppose the desired working distance to be thirty-three centimeters. The amplitude of accommodation is 1.50 diopters and the refraction of the eye one diopter myopia, two-thirds of the accommodation, one diopter. Subtract from the glass representing thirty-three centimeters three diopters, leaves a remainder of two diopters. Add this to distance correction minus one diopter added to plus two diopters, combined, leaves an optical effect of plus one diopter, which is the glass we prescribe for a patient fifty years of age.

Pointer B is used only to hold in view the punctum remotum of the patient under consideration, thus saving recording it or holding it in memory and leaving it to refer to after the patient has left the office, when a full record can be made in the record-book from the machine or chart.

The scale F is only marked for acquired hypermetropia, simple hypermetropia, and emmetropia. It is not marked off in the myopic row at all, as a myope even of one diopter would not become hypermetropic until eighty years of age.

The pointer B is always placed on the punctum remotum, because as soon as the occulist has determined the punctum remotum of the patient he knows which class the patient belongs to, as the punctum remotum is the index of the class. The punctum remotum of the emmetrope is at infinity. The hypermetropic eye has its punctum remotum beyond infinity. The myopic eye has its punctum remotum at a finite distance.

To consider a hypermetropic eye, we test the patient by some of the ways we have— the trial case, the opthalmoscope, retinoscope, &c. Say we find him hypermetropic one diopter. Then we know his punctum remotum is one diopter behind his eye. So to keep our finding we turn B pointer onto "1 D" in the hypermetropic row in the sector inside circle with the word "age." Each sector represents a diopter in width. Scale F divides it into quarters. If the patient was fifty-five years old, we would set pointer B on the first quarter, thus showing him to have 0.25 of acquired hypermetropia; but this patient is ten years of age, so we place pointer B age end up on the ten years in age row. The "A. of A." end shows our patient's near point seven centimeters, his amplitude of accommodation fourteen diopters. This would be the same as an emmetrope.

To find the amplitude of accommodation of a hypermetrope, we must add on to the lens whose focal length equals the distance of the near point that convex lens which enables him to see distant objects distinctly. Thus our chart will measure the ametrope as well as the emmetrope.

What I do claim as my invention, and desire to secure by Letters Patent, is—

The herein-described dioptrical chart, containing formulæ indicative of the punctum proximum and the amplitude of accommodation of the emmetrope and the ametrope at any given age, in combination with a rotatable single index-bearing disk, and a double-ended index rotatable independently of the single index, both indexes being employed in reading the chart, substantially as described.

In testimony whereof I have signed my name to this specification in the presence of two subscribing witnesses.

WILLIAM WILLARD MARTIN.

Witnesses:
THOS. H. REYNOLDS,
J. CLEM LEWIS.